Figure 1:
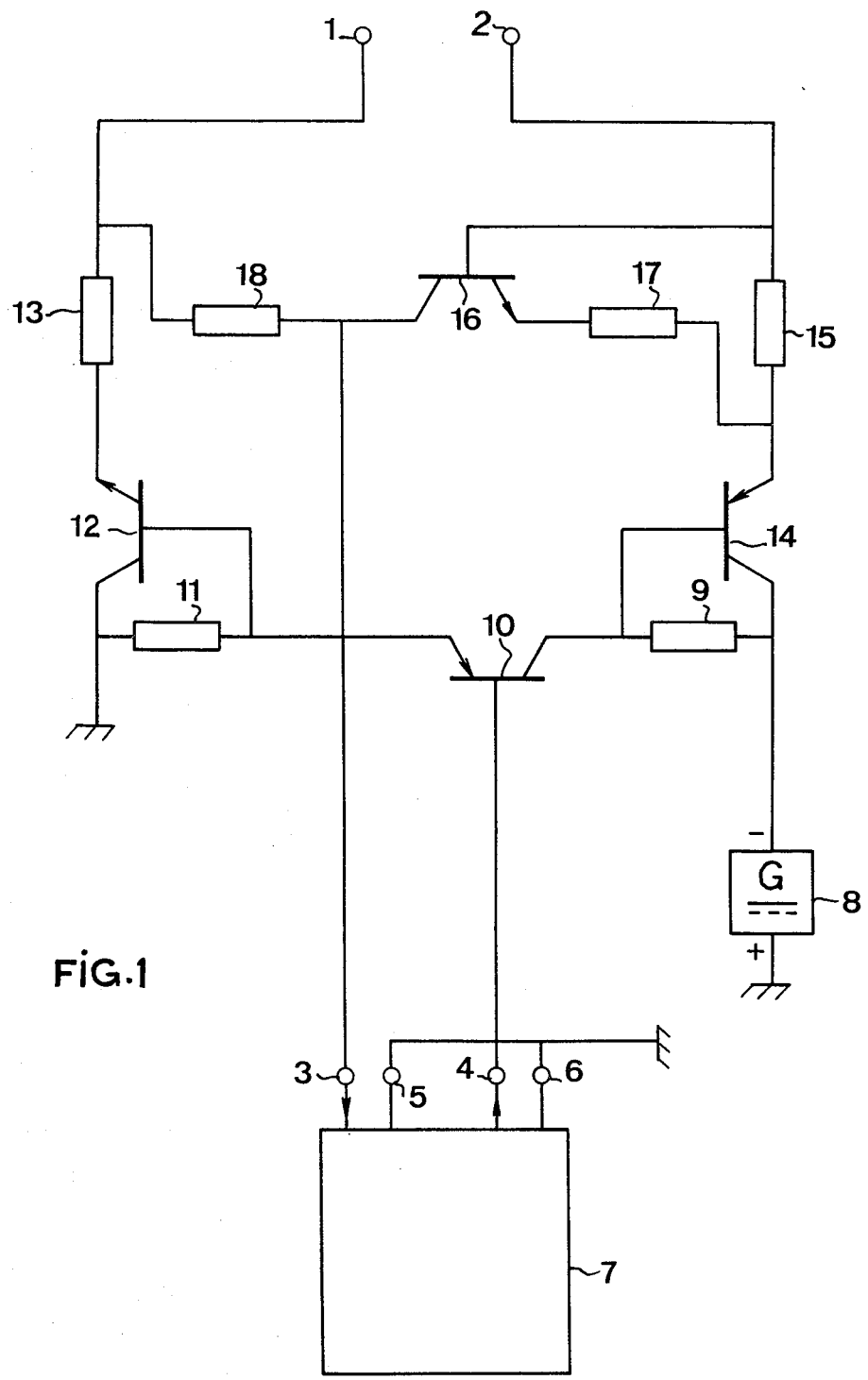

United States Patent [19]

Dumont et al.

[11] 4,302,636

[45] Nov. 24, 1981

[54] SUBSCRIBER'S ELECTRONIC LINE EQUIPMENT COMPRISING A TWO-WIRE-FOUR-WIRE CONVERSION CIRCUIT FOR A TELEPHONE EXCHANGE

[75] Inventors: Alian Dumont, Montceau-les Mines; Christian Piolat, Villeurbanne; Guy Oeillet, Montceau-les Mines, all of France

[73] Assignee: Jeumont-Schneider, Puteaux, France

[21] Appl. No.: 101,863

[22] PCT Filed: Sep. 19, 1978

[86] PCT No.: PCT/FR78/00024

§ 371 Date: May 27, 1979

§ 102(e) Date: May 24, 1979

[87] PCT Pub. No.: WO79/00158

PCT Pub. Date: Apr. 5, 1979

[30] Foreign Application Priority Data

Sep. 27, 1977 [FR] France .................... 77 29048

[51] Int. Cl.³ .............................................. H04B 1/58
[52] U.S. Cl. .......................... 179/170 NC; 179/170 T

[58] Field of Search .......... 179/81 A, 170 T, 170 NC, 179/81 B

[56] References Cited

U.S. PATENT DOCUMENTS

| | | | |
|---|---|---|---|
| 3,180,947 | 4/1965 | Haselton, Jr. et al. | 179/170 NC |
| 3,513,259 | 5/1970 | Lindgren et al. | 179/170 NC |
| 3,886,322 | 5/1975 | Colardelle et al. | 179/170 NC |
| 4,081,616 | 3/1978 | Dumont | 179/81 A |

Primary Examiner—Bernard Konick
Assistant Examiner—Randall P. Myers
Attorney, Agent, or Firm—Schwartz, Jeffery, Schwaab, Mack, Blumenthal & Koch

[57] ABSTRACT

Equipment without telephone transformer or amplifier.

It is connected to the subscriber by terminals (1, 2) and to the telephone exchange by terminals (3, 4, 5, 6). It comprises a d.c. voltage source (8), four transistors (10, 12, 14, 16) and three pairs of equal resistors (9-11, 13-15 and 17-18). Sidetone is eliminated by the circuit (18-1-6-17).

Of use in telephone exchanges of all kinds.

3 Claims, 3 Drawing Figures

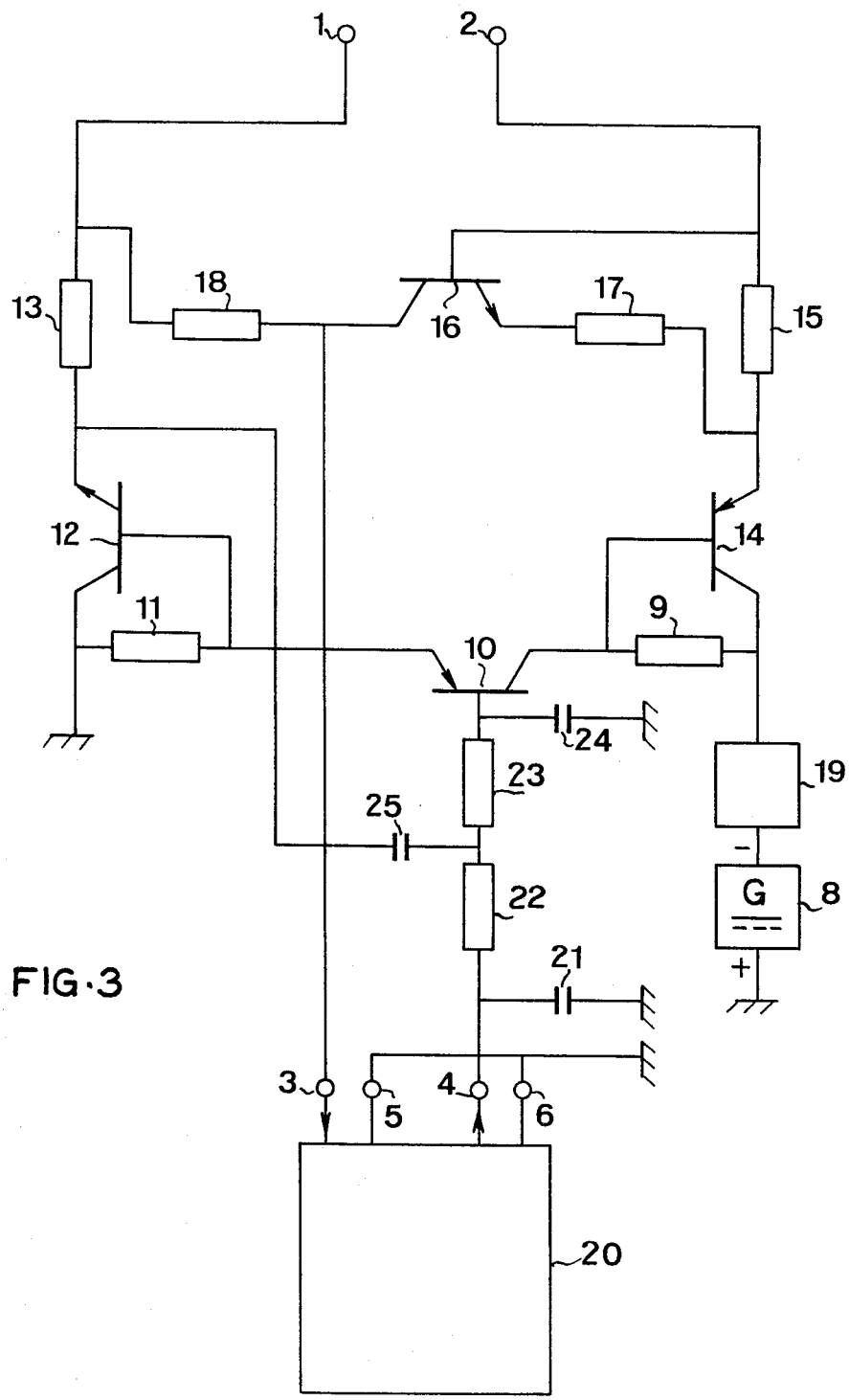
FIG·3

SUBSCRIBER'S ELECTRONIC LINE EQUIPMENT COMPRISING A TWO-WIRE-FOUR-WIRE CONVERSION CIRCUIT FOR A TELEPHONE EXCHANGE

The invention relates to subscriber's electronic line equipment comprising a two-wire-four-wire conversion circuit, for a telephone exchange.

There are a number of methods of manufacturing equipment of this kind.

Usually, known electronic equipment performs at least the following functions: transmission of voice-frequency signals in both directions, using a two-wire-four-wire conversion circuit; d.c. supply to the subscriber's line; and elimination of sidetone. Sometimes it performs the following additional functions: detection of a loop closure and calling the subscriber. However, it does not stabilize the d.c. at e.g. 30 mA in the subscriber's line, since stabilization has hitherto been brought about by means disposed not in the exchange but at the subscriber's end.

In most known equipment, the two functions of transmitting voice-frequency signals and supplying the subscriber's line are performed independently and separately, and sidetone is eliminated by a telephone transformer or electronic circuit comprising differential amplifiers.

The equipment according to the invention has the advantageous feature of combining the aforementioned two functions and eliminating sidetone by using a single transistor without an amplifier or telephone transformer.

The transistor circuit used according to the invention greatly simplifies the subscriber's line equipment, saves space and cost, and can be constructed almost entirely in integrated-circuit form. It can also easily be combined with a d.c. stabilizer in the subscriber's line, irrespective of the length of the line and automatically without any previous adjustment, whereas usually d.c. stabilization is brought about at the subscriber's end by adjusting the resistance before putting the line into service.

In the special case of a time-division multiplex telephone exchange, the equipment accordng to the invention can be used without modification and, in addition, some of its components are used to construct the filter circuit for restoring the voice-frequency signal from the received samples thereof. This saves additional components, space and cost.

The equipment according to the invention is characterised in that it comprises:

a d.c. voltage source having its positive terminal connected to the chassis, a first transistor having its base connected to the transmission output of the telephone exchange, its emitter connected to the chassis by a first resistor and its collector connected to the negative terminal of the d.c. voltage source by a second resistor identical with the first, a second transistor having its base connected to the emitter of the first transistor, its collector connected to the chassis and its emitter connected to the first wire of the subscriber's line by a third resistor, a third transistor having its base connected to the collector of the first transistor, its collector connected to the negative terminal of the source and its emitter connected to the second wire of the subscriber's line by a fourth resistor identical with the third and having a value equal to half the total impedance of the line and the subscriber's set, the second transistor and the third transistor being of the opposite kind with respect to each other, and a fourth transistor having its base connected to the second wire of the subscriber's set, its emitter connected to the emitter of the third transistor by a fifth resistor and its collector connected (a) to the first wire of the subscriber's line by a sixth resistor identical with the fifth, and (b) to the receiving input of the telephone exchange.

Figure 2:
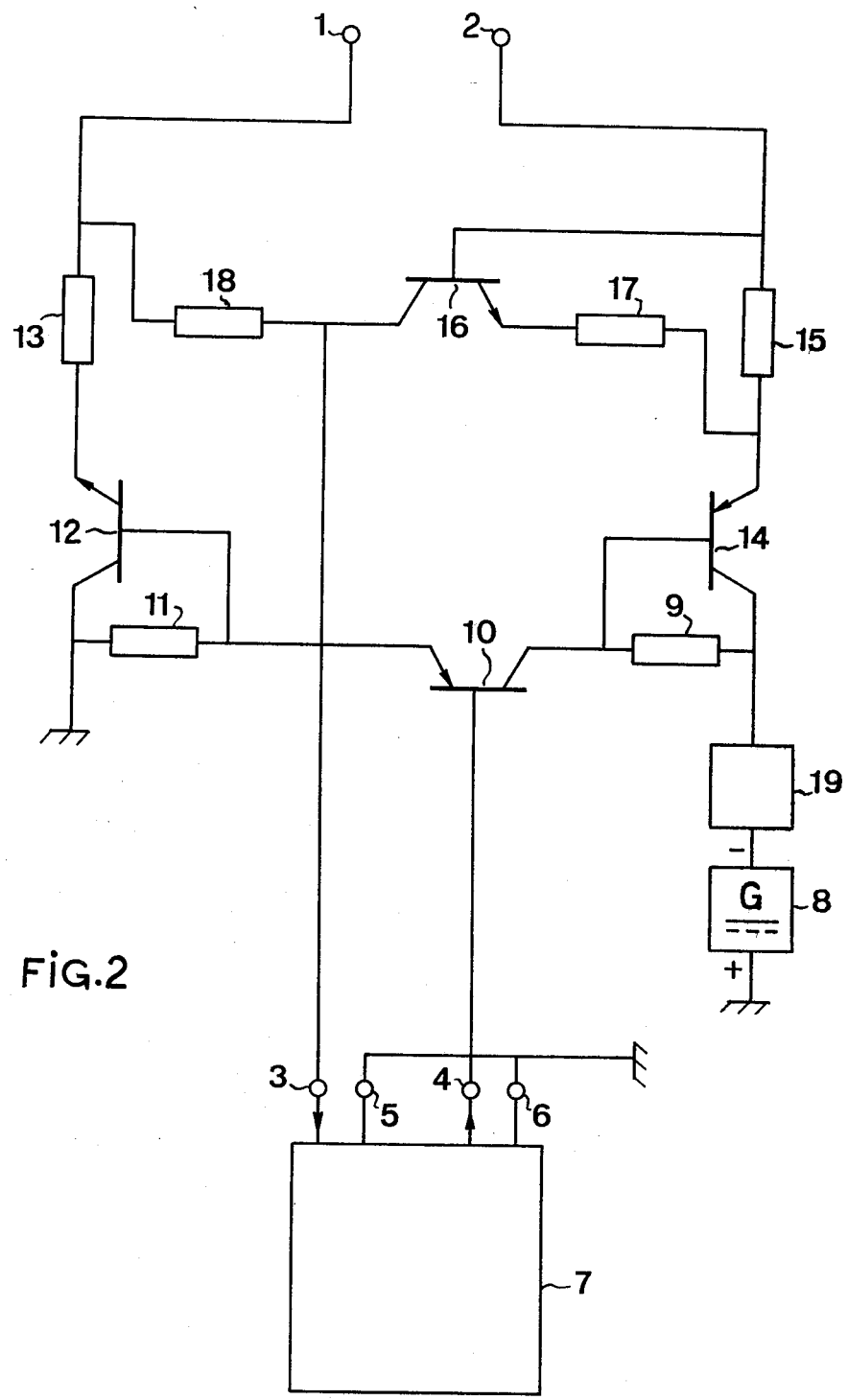

The invention will be more clearly understood from embodiments and the accompanying drawings in which:

FIG. 1 is a diagram of subscriber's electronic line equipment for a telephone exchange using any kind of switching, (space or time) without a d.c. stabilizer for the subscriber's line, FIG. 2 is the same diagram as in FIG. 1 but with a stabilizer of the aforementioned kind, and FIG. 3 is a diagram of equipment similar to that in FIG. 2 but also comprising a storage capacitor and a filter circuit for installations in a time-division multiplex telephone exchange.

In FIG. 1, the subscriber's equipment is connected (a) by terminals 1 and 2 to the corresponding subscriber's line and (b) by terminals 3, 4 and terminals 5, 6 to the telephone exchange 7. Terminal 3 is used for the voice-frequency signal transmitted by the subscriber to the exchange 7, and terminal 4 is used for the voice-frequency signal from exchange 7.

A d.c. voltage source 8 has its positive terminal connected to the chassis and its negative terminal connected by a resistor 9 to the collector of a PNP type transistor 10 having its base connected to terminal 4 and its emitter connected to the chassis by a resistor 11 having the same value as resistor 9.

A second transistor 12 (NPN type) has its base connected to the emitter of transistor 10, its collector connected to the chassis and its emitter connected to terminal 1 by a resistor 13.

A third transistor 14 (PNP type) has its base connected to the collector of transistor 10, its collector connected to the negative terminal of source 8 and its emitter connected to terminal 2 by a resistor 15 having the same value as resistor 16.

A fourth transistor 16 (NPN type) has its base connected to terminal 2, its emitter connected to the emitter of transistor 14 by a resistor 17 and its collector connected to terminal 3 and also connected to terminal 1 by a resistor 18. Resistors 17 and 18 have the same value.

Transistor 10 is a phase-shifting transistor having an emitter resistance equal to its collector resistance.

Transistors 12 and 14 are matching transistors.

Circuit 16, 17, 18 is a sidetone eliminating circuit wherein transistor 18 has unit gain since resistors 17 and 18 are equal.

The equal resistors 13 and 15 must be chosen so that, when considering the circuit for transmitting the subscriber's voice-frequency signal to the exchange, where the telephone acts as a generator for producing a given voltage between terminals 1 and 2, a voltage equal to half the last-mentioned voltage appears at the terminals of each of the two resistors 13 and 15, assuming that the subscriber's set is equivalent to a circuit comprising only the two resistors 13 and 15 in series between terminals 1 and 2.

The transistor assembly according to the invention operates as follows:

We shall assume that the line and the subscriber's telephone (connected between terminals 1 and 2 but not shown in the diagram) together have an impedance of 600 ohms and the two resistors 13 and 15 have half this resistance, i.e. 300 ohms each, which corresponds to conventional telephone installations.

The voltage applied betwee 4 and 6, due to the voice-frequency signal from exchange 7, is applied (a) in the same direction between the emitter of transistor 10 and the chassis and (b) in the opposite direction between the collector of transistor 10 and the chassis, so that the resulting voltage between the bases of transistors 12 and 14 is double the voltage applied between 4 and 6. This results in a voltage of half the value occurring at the terminals of resistors 13 and 15 whereas the voltage between terminals 1 and 2 is equal to that applied between 4 and 6, which meets the required conditions.

When a voltage is applied between terminals 4 and 6, half of it appears at the terminals of resistor 15 and consequently at the terminals of resistor 18. The output voltage between terminals 3 and 5 is then zero, which means that sidetone has been eliminated.

The voltage applied between 1 and 2, due to the voice-frequency signal transmitted by the subscriber, is equally divided between resistors 13 and 15, since the situation is the same as if the emitters of transistors 12 and 14 were connected to the chassis, in view of the very low impedance of these transistors relative to the chassis.

The same voltage is equally distributed between resistors 17 and 18.

Consequently the voltage, relative to the chassis, at the collector of transistor 16 is equal to the sum of the voltages at the terminals of resistors 18 and 13, i.e. the applied voltage.

FIG. 2 shows the same components as in FIG. 1, bearing the same reference numbers. The only difference is that a current stabilizing circuit 19 has been inserted between generator 8 and assembly 9, 14 in order to impose a given current, e.g. 30 mA, in the subscriber's line.

The current limited to 30 mA by 19 must flow along the following circuit: 8, 14, 15, the line and subscriber's set connected between 1 and 2, then 13, 12 and the chassis.

Alternatively, generator 8 in FIG. 1 can be replaced by a known constant-current generator.

FIG. 3 relates to subscriber's equipment specifically designed for installation in a time-division multiplex electronic exchange 20. The subscriber's equipment differs from that in FIG. 1 or FIG. 2 in that it contains a storage capacitor 21 connected between terminal 4 and the chassis and also contains a filter circuit comprising: two resistors 22 and 23 connected in series between terminal 4 and the base of transistor 10, the latter being connected to the chassis via a capacitor 24, and a capacitor 25 connected between the emitter of transistor 12 and the connection between 22 and 23. The real filter circuit comprises not only the aforementioned components but also transistors 10 and 12 and resistor 11, one end of which is connected to the chassis. Normally a second-order low-pass filter similar to that in FIG. 3 would comprise components 22-25 connected in the same manner plus an amplifier having one input connected to the common point of 23 and 24 and its output connected to (a) the base of transistor 10 and (b) the left electrode of capacitor 25, which would not be connected to the emitter of transistor 10. Clearly, arm 10, 11, 12 plus the chassis acts as an amplifier for the filter circuit 22-25 added to the subscriber's equipment. Consequently the circuit in FIG. 3 saves the use of an amplifier.

The equipment according to the invention is particularly suitable for manufacture in the form of integrated circuits.

We claim:

1. A subscriber's electronic line equipment comprising a two-wire-four-wire conversion circuit for a telephone exchange, characterized in that it comprises:
   a d.c. voltage source (8) having its positive terminal connected to a chassis,
   a first transistor (10) having its base connected to the transmission output (4) of the telephone exchange (7), its emitter connected to said chassis by a first resistor (11) and its collector connected to the negative terminal of a d.c. voltage source (8) by a second resistor (9) having a resistance equal to the resistance of said first resistor (11),
   a second transistor (12) having its base connected to the emitter of the first transistor (10), its collector connected to said chassis and its emitter connected to a first wire (1) of the subscriber's line by a third resistor (13),
   a third transistor (14) having its base connected to the collector of the first transistor (10), its collector connected to the negative terminal of the voltage source (8) and its emitter connected to a second wire (2) of the subscriber's line by a fourth resistor (15) having a resistance equal to the resistance of said third resistor and equal to half the total impedance of the line and the subscriber's set, the second transistor (12) being of the opposite polarity-type from the third transistor (14),
   a fourth transistor (16) having its base connected to the second wire (2) of the subscriber's set, its emitter connected to the emitter of the third transistor (14) by a fifth resistor (17) and its collector connected (a) to the first wire (1) of the subscriber's line by a sixth resistor (18) having a resistance equal to the resistance of said fifth resistor, and (b) to the receiving input (3) of the telephone exchange (7).

2. Equipment according to claim 1, characterized in that it comprises a stabilizing circuit (19) for the current from the voltage source (8), the stabilizing circuit being inserted in series with the voltage source (8) in order to give a predetermined value to the current.

3. Equipment according to claims 1 or 2 for a time-division multiplex telephone exchange (20) characterized in that it comprises:
   a filter circuit connected between the transmission output (4) of the telephone exchange (20) and the base of the first transistor (10) and comprising (a) two resistors (22, 23) connected in series having their series connection connected to the emitter of the second transistor (12) by a first capacitor (25) and (b) a second capacitor (24) connected between the chassis and the base of the first transistor (10), and
   a third capacitor (12) connected between the chassis and the transmission output (4) of the telephone exchange.

* * * * *